United States Patent [19]

Katsuoka

[11] Patent Number: 4,476,767

[45] Date of Patent: Oct. 16, 1984

[54] KEYBOARD INPUT CODING DEVICE AND MUSICAL NOTE DISPLAYING DEVICE

[75] Inventor: Ritsu Katsuoka, Ena, Japan

[73] Assignee: Ricoh Watch Co., Ltd., Aichi, Japan

[21] Appl. No.: 403,633

[22] PCT Filed: Nov. 17, 1981

[86] PCT No.: PCT/JP81/00336

§ 371 Date: Jul. 19, 1982

§ 102(e) Date: Jul. 19, 1982

[87] PCT Pub. No.: WO82/01783

PCT Pub. Date: May 27, 1982

[30] Foreign Application Priority Data

Nov. 20, 1980 [JP] Japan ............ 55-162601

[51] Int. Cl.$^3$ ............ G09B 15/00; G10F 5/00

[52] U.S. Cl. ............ 84/115; 84/478

[58] Field of Search ............ 84/1.01, 1.03, 477 R, 84/478, 115

[56] References Cited

U.S. PATENT DOCUMENTS 4,022,097 5/1977 Strangio ............ 84/1.03

4,318,327 3/1982 Toups ............ 84/477 R

*Primary Examiner*—Stanley J. Witkowski

*Attorney, Agent, or Firm*—Oblon, Fisher, Spivak, McClelland & Maier

[57] ABSTRACT

This invention relates to a keyboard input coding device comprising a counter for counting ON and OFF duration of signals obtained by pushing a keyboard, an encoder for producing codes of musical interval corresponding to keys of the keyboard, a note-length discriminating circuit for taking count values from the counter based on signals from the keyboard and discriminating a note-length, a note-length memory circuit for receiving or supplying the note-length data from or to the note-length discriminating circuit, a reference time generating circuit for supplying the note-length discriminating circuit with data of partitioning a musical section and a processing control circuit, wherein the discrimination of the note-length is effected by referring to the note-length between sequential notes according to data stored in the memory circuit, thereby a musical note with a note-length to agree well with intention of an operator is coded after correcting the key input duration data according to estimates made from the relation of the note-length between sequential notes, and also to a musical note displaying device comprising a CRT display, a character ROM, a video RAM and a timing circuit for these circuits, wherein an additional note-chaining circuit is provided to take musical note data outputted by the keyboard input coding device, note-chaining data (musical interval) between sequential two musical notes and note-chaining pattern selecting data in the musical note data and to generate note-chaining pattern corresponding to musical note position, and the note-chaining pattern data generated from the additional note-chaining circuit and the musical note pattern of the character ROM are superposed so as to produce a chained note thereby a musical note is displayed at pattern which can be clearly seen as a staff.

10 Claims, 25 Drawing Figures

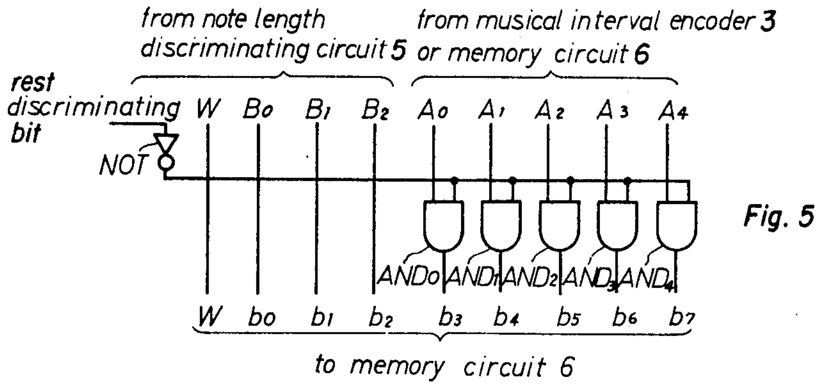
Fig. 5
Fig. 6
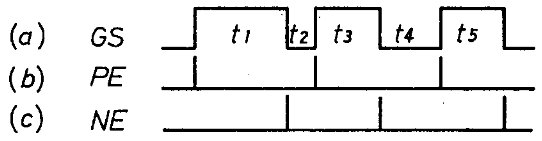
Fig. 7
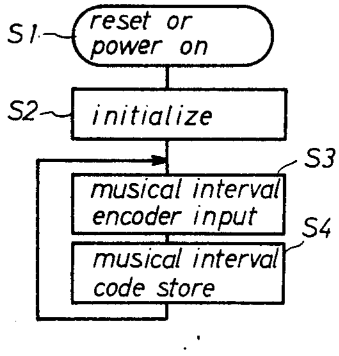

| b0 | b1 | b2 | b3 | b4 | b5 | b6 | b7 | b8 | b9 | b10 | b11 |
|---|---|---|---|---|---|---|---|---|---|---|---|
| A0 | A1 | A2 | B0 | B1 | B2 | B3 | B4 | C0 | C1 | C2 | C3 |
| note-length code | | | musical interval code | | | | | note-chaining selecting data | | | |

KEYBOARD INPUT CODING DEVICE AND MUSICAL NOTE DISPLAYING DEVICE

BACKGROUND OF THE INVENTION

1. Field of the Invention

This invention relates to a keyboard input coding device and a musical note displaying device, wherein signals obtained by pushing a keyboard are coded into musical notes for pattern displaying or a staff.

2. Description of the Prior Art

In such a coding device in prior art, duration of pushing keys of a keyboard is coded into note-length data at a real time. A musical note in the coding is therefore liable to be different from that intended by a player.

For example, assuming that a one time reference pulse (in sound output) as shown in "a" of FIG. 1(A) corresponds to one interval of a quarter note, keying input is given in such a pattern as shown in "b" of FIG. 1(A) in order to perform continuously. If the coding is based on the intervals $t_1$–$t_7$ of key input "H" (key pushing) and "L" (key releasing) without modification, an intended note is a quarter note as shown in "c" of FIG. 1(A) but quite unreasonable coding of notes would be effected as shown in "d" of FIG. 1(A).

Also, assuming that one time reference pulse as shown in "a" of FIG. 1(B) corresponds to one interval of a quarter note, a triplet as shown in "c" of FIG. 1(B) is intended. Since a triplet is discriminated when one interval of silence is followed by one interval including three notes of nearly equal note-length (a quarter note), the coding based on key input intervals in such a pattern as shown in "b" of FIG. 1(B) in a real time would produce the code output as shown in "d" of FIG. 1(B). Accordingly, detection of a triplet in this manner is quite difficult.

When a keyboard input is displayed as pattern of musical note signals, for example, if a musical note character is constituted by eighth or sixteenth notes with hook, indication of the character per note produces a staff which is quite indistinct as shown in FIG. 2(A).

Accordingly, it is an object of this invention is to provide a keyboard input coding device in which a musical note with a note-length to agree well with intention of a player is coded after correcting the key input duration data according to estimates made from the relation of the note-length between sequential notes.

Another object of the invention is to provide a musical note displaying device in which sequential eighth or sixteenth notes are coded by the above described keyboard input coding device and displayed in the form of a chain of notes under a given condition thereby the displayed pattern of musical notes can be readily seen.

This invention relates to a keyboard input coding device comprising a keyboard device for generating signals by means of keying operation, means for detecting rise and fall states of signals from the keying device, a counter for counting ON and OFF duration of the keyboard signals, an encoder for producing codes of musical interval corresponding to keys of the keyboard device, a note-length discriminating circuit for taking count values from the counter based on signals from the detecting means and discriminating a note-length, a note-length memory circuit for receiving or supplying the note-length data from or to the note-length discriminating circuit, a reference time generating circuit for supplying the note-length discriminating circuit with data of partitioning a musical section and a processing control circuit, wherein the discrimination of the note-length is effected by referring to the note-length between sequential notes according to data stored in the memory circuit, thereby a musical note with a note-length to agree well with intention of an operator is coded after correcting the key input duration data according to estimates made from the relation of the note-length between sequential notes, and also to a musical note displaying device comprising a CRT display, a character ROM, a video RAM and a timing circuit for these circuits, wherein an additional note-chaining circuit is provided to take musical note data outputted by the keyboard input coding device, note-chaining data (musical interval) between sequential two musical notes and note-chaining pattern selecting data in the musical note data and to generate note-chaining pattern corresponding to musical note position, thereby the note-chaining pattern data generated from the additional note-chaining circuit and the musical note pattern of the character ROM are superposed so as to produce a chained note and to display a musical note at pattern which can be clearly seen.

BRIEF DESCRIPTION OF DRAWINGS

FIG. 5 is a specific circuit diagram of a note synthesizing circuit in this invention;

FIG. 6 is a time chart in a differentiating circuit of this invention;

FIG. 7 is a flow chart illustrating a constitution example of a main routine of this invention;

DETAILED DESCRIPTION OF THE PREFERRED EMBODIMENT

An embodiment of this invention will now be described referring to the accompanying drawings.

Figure 3:
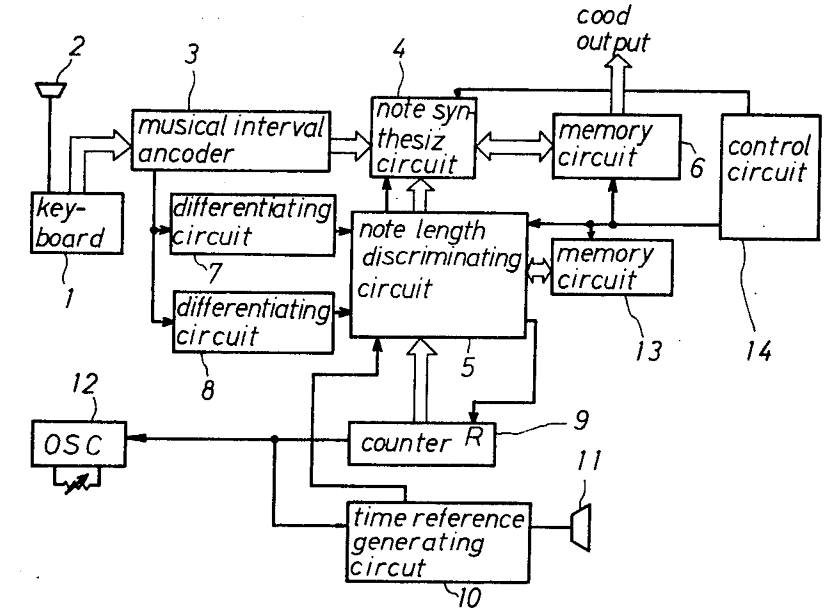
FIG. 3 is a block diagram illustrating an example of a keyboard input coding device according to this invention.
Figure 4:
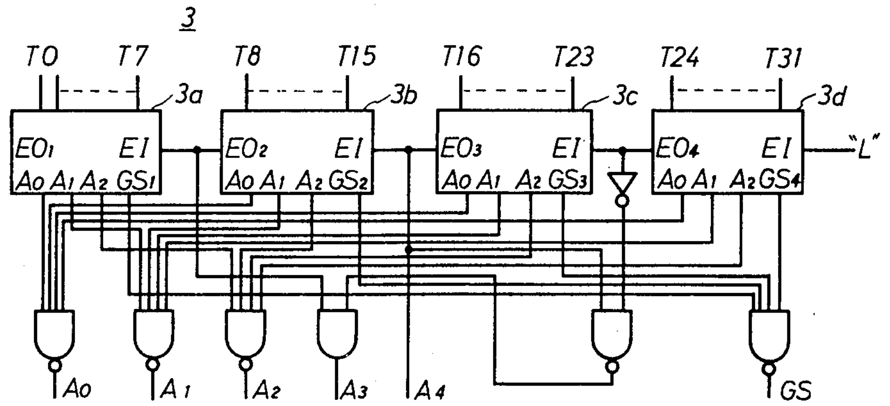
FIG. 4 is a specific circuit diagram of a musical interval encoder in this invention.

FIG. 3 is a block diagram illustrating an example of a keyboard input coding device according to this invention. In the figure, reference numeral 1 designates a keyboard device, and musical sound by pushing keys of the keyboard device 1 is generated at a speaker 2 through a musical sound generating device contained in the keyboard device. Numeral 3 designates a musical interval encoder to create musical interval codes corresponding to individual keys of the keyboard device 1. In the case of 31 keys for example, four encoders *3a–3d* are combined for coding eight inputs into three bits as shown in FIG. 4, input terminals $T_0$–$T_{31}$ correspond to individual keys of the keyboard, and musical interval codes of five bits corresponding to 32 inputs of $T_0$–$T_{31}$ are entered to output terminals $A_0$–$A_4$. In FIG. 4, $E_I$ designates enable input terminal $EO_1$–$EO_4$ enable output terminals, $GS_1$–$GS_4$ terminals to output the "L" level when $E_I$ is in enable state and the keyboard input is entered to any of the input terminals.

A code synthesizing circuit 4 to synthesize musical interval data of five bits obtained in the musical interval encoder 3 and note-length data obtained in a hereinafter described note-length discriminating circuit 5, comprises a circuit as shown in FIG. 5 to constitute data of nine bits. To lines of upper four bits are applied the musical interval data to be entered in output terminals W, $B_0$–$B_2$ (W: data to constitute a triplet, $B_0$–$B_2$: note-length data) of the note-length discriminating circuit 5; to lines of lower five bits are applied the musical interval data to be entered in output terminals $A_0$–$A_4$ of the musical interval encoder 3. Synthesized data from the code synthesizing circuit 4, i.e. code data are transmitted through a memory circuit 6 to store the musical interval data into a hereinafter described note pattern displaying means or the like. The note-length discriminating circuit 5 transmits a rest discriminating signal into the code synthesizing circuit 4. When the rest discriminating signal is entered through a "not" gate NOT into "and" gates $AND_0$–$AND_4$ connected to lines of musical interval data, musical interval data outputs $b_3$–$b_7$ are all made "L" and distinguished from musical note data.

The note-length data is identical in notes and rests. The memory circuit 6 is provided so as to enable non-real time processing of a triplet or the like where two or three notes are output together.

An output terminal GS of the musical interval encoder 3 is connected to a rise differentiating circuit 7 and a fall differentiating circuit 8, which act respectively at the rising state and the falling state of signals obtained by pushing keys of the keyboard device 1. Output signals of the differentiating circuits 7, 8 are entered as note-length processing signals in the note-length discriminating circuit 5.

The output terminal GS of the musical interval encoder 3 transmits signals with wave form shown in FIG. 6"*a*" by pushing keys. "H" level of the signal corresponding to period of key pushing, and "L" level corresponds to period of key releasing. At the rising time of signal, differentiating signal PE shown in FIG. 6"*b*" is transmitted from the differentiating circuit 7; at the falling time, differentiating signal NE shown in FIG. 6"*c*" is transmitted from the differentiating circuit 8. Therefore, if the period from the signal PE to the signal NE is counted by a counter 9, original data of note-length can be obtained as shown in $t_1$, $t_3$, $t_5$ of FIG. 6"*a*"; if the period from the signal NE to the signal PE is counted, original data of rest-length can be obtained as shown in $t_2$, $t_4$. On receiving the signal PE the note-length discriminating circuit 5 takes the count value of the counter 9 as key input rest period and then resets the counter 9 to start the next counting, whereas on receiving the signal NE it takes the count value of the counter 9 as key input period and outputs the reset signal.

As above described, outputs of the rise differentiating circuit 7 and the fall differentiating circuit 8 are generated respectively at edge of ON and OFF states of key inputs and become interruption signals to make the note-length discriminating circuit 5 perform processing corresponding to a musical note and a rest.

The note-length discriminating circuit 5 receives not only the original data obtained by the counting operation of the counter 9 but also signals from a time reference generating circuit 10. The time reference generating circuit 10 properly performs the frequency dividing of outputs from clocksignal generating circuit 11 which outputs are used commonly with the counter 9 thereby generates one pulse per one interval of a quarter note and acts as a metronome. The pulse is supplied as data of partitioning a musical section to the note-length discriminating circuit 5 and also to a speaker 12 which produces a time reference sound.

If one pulse is generated per one interval of a quarter note as above described, one time reference signal is output when the count value of the counter 9 becomes 64. Based on this, relation between the original data of note-length and the count value is shown in Table 1 as follows:

TABLE 1

| count value | 8–15 | 16–23 | 24–31 | 32–39 | 40–47 | 48–63 | 64–95 | 96–127 | 128–191 | 192–256 |
|---|---|---|---|---|---|---|---|---|---|---|
| note-length | 𝅘𝅥𝅯 | 𝅘𝅥/3 | 𝅘𝅥 | 𝅘𝅥/3 | 𝅘𝅥𝅮 | 𝅘𝅥 | 𝅘𝅥 | 𝅗𝅥 | 𝅘𝅥. | 𝅝 |

Although Table 1 shows the case of musical notes, allocation of the count value to the note is similarly applied to the case of rests. However, keying input of the keyboard is always accompanied by a period of silence when it is transferred from one note to another note. In order to avoid the discrimination of this period of silence as a sixteenth rest (𝄿) or a thirty-second rest (𝅀), the note-length discriminating circuit 5 is constituted to neglect a rest of 𝄿 or less, i.e. the count value of 15 or less. Notes or rests in connection with the count value of a sixteenth note or less, such as 𝅘𝅥𝅯 𝅘𝅥𝅯. 𝄾. 𝄿. are replaced by any note or rest which is set forth in Table 1 and has the count value close thereto so as to avoid confusion.

A memory circuit 13 is added to the note-length discriminating circuit 5, and note-length data taken from the counter 9 and established data of note-length discrimination are stored in the memory circuit 2. Thereby the note-length discriminating circuit 5 discriminate the note-length sign based on the count value taken from the counter 9 and content of the memory circuit 2 (previous count value of the counter) and the sign is deduced as shown in Table 2.

TABLE 2

| note-length | $B_o$ | $B_1$ | $B_2$ | W |
|---|---|---|---|---|
| 𝅘𝅥𝅯 | 0 | 0 | 0 | |
| ♪ | 1 | 0 | 0 | 1/0 |
| ♪. | 0 | 1 | 0 | |
| ♩ | 1 | 1 | 0 | 1/0 |
| ♩. | 0 | 0 | 1 | |
| 𝅗𝅥 | 1 | 0 | 1 | |
| 𝅗𝅥. | 0 | 1 | 1 | |
| 𝅝 | 1 | 1 | 1 | |

Wherein $B_0$–$B_2$ are codes of three bits corresponding to note-length ranging 𝅘𝅥𝅯 – 𝅝, and W shows one note to constitute a triplet and is added only to code of ♪ or ♩.

Numeral 14 designates a control circuit (corresponding to a central processing unit CPU) to control the code synthesizing circuit 4, the note-length discriminating circuit 5 and note-length discriminating circuits 6 and 13.

Coding operation of the invention device in above mentioned constitution will now be described.

Figure 8:
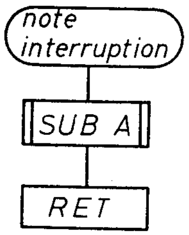
FIGS. 8(A),(B),(C) is a flow chart of interruption routines of a note, a rest and a section line respectively.
Figure 8:
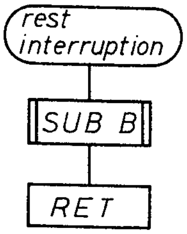
Figure 8:
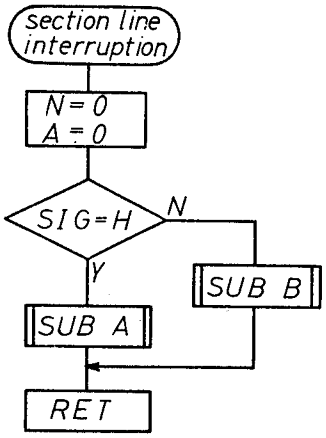

First, a main routine will be described referring to FIG. 7. If the main routine is started by reset or power ON at step $S_1$, it is transferred to step $S_2$ and initializing of the system (content of the memory circuit) is performed. Then, if key input is entered by pushing keys of the keyboard device, it is coded by the musical interval encoder 3, and the musical interval code is entered at step $S_3$ and stored in the memory circuit 6 at step $S_4$. Processings at the steps $S_3$ and $S_4$ are repeated, and interruption of outputs from the rise differentiating circuit 7 or the fall differentiating circuit 8 is waited. As previously mentioned, the interruption includes a musical section line interruption from the time reference generating circuit 10, a rest interruption from the rise differentiating circuit 7 and a note interruption from the fall differentiating circuit 8. The individual interruption subroutines are constituted as shown in FIG. 8.

FIG. 8(A) shows the note interruption subroutine, FIG. 8(B) the rest interruption subroutine, and FIG. 8(C) the musical section line subroutine. SUB A designates a note coding routine and SUB B designates a rest coding routine, and processing flow of both coding routines is constituted as shown in FIGS. 9(A),(B).

Figure 9:
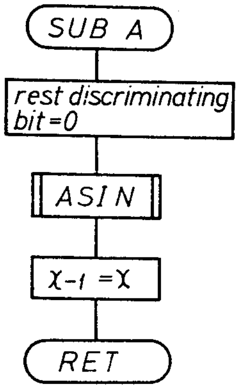
FIGS. 9(A),(B) is a flow chart of subroutines SUB A, B in above mentioned interruption routines.
Figure 9:
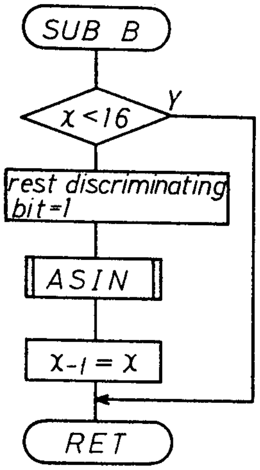

If interruption signal is entered from the fall differentiating circuit 8 to the note-length discriminating circuit 5, the note-length discriminating circuit 5 is in a note coding processing flow, and as shown in FIG. 9(A) the discriminating circuit 5 performes the note-length allocation assuming that rest discriminating bit=0 and executes a note-length discriminating processing routine ASIN. The count value X, which is based on the counter 9 at this time and discriminated by the note-length discriminating circuit 5, is replaced by the count value X−1 which is stored in the memory circuit 13 at the previous sampling of one before this time.

At the completion, this processing is returned to step 53 of the musical interval code input.

If interruption signal is entered from the rise differentiating circuit 8 to the note-length discriminating circuit 5, the rest coding routine SUB B starts and executes a processing flow of FIG. 9(B). In this processing flow, whether the rest-length is X<16 or not is first discriminated, if X<16 the rest-length is neglected and the processing is returned, and the rest smaller than a sixteenth rest is eliminated. If X≧16, rest discriminating bit is set to 1 (it means rest) and the note-length allocation is performed, and the note-length allocation processing routine ASIN is executed. Then, the count value X, which is based on the counter 9 at this time and discriminated by the note-length discriminating circuit 5, is replaced by the count value X−1 which is stored in the memory circuit 13 at the previous sampling of one before this time. At the completion, this processing is returned to step of the musical interval code input again.

If the musical section line interruption signal is introduced from the time reference generating circuit 10 to the note-length discriminating circuit 5, the note-length discriminating circuit 5 is in a processing flow of FIG. 8(C). In the case of four-quarter measure for example, the processing is executed so that a musical section line is entered at every four intervals of note, and the storing point of note within the section becomes zero, i.e. N=0 and address A of coding data store for notes and rests in the memory circuit 6 becomes A=0. In this case, if the musical section line interruption is introduced during the key-pushing operation, discrimination of whether sign is a note or a rest cannot be performed. Therefore whether the key input signal is "H" or not is decided, and if the key input signal="H" the subroutine SUB A is executed, or otherwise if the key input signal is not "H" the subroutine SUB B is executed.

Operation of the note-length allocation processing ASIN will now be described referring to FIGS. 10(A),(B). In the figure, N: the number of intervals of a sixteenth note as a unit in a musical section (stored in the memory circuit 13)

A: coding data store address for notes and rests in a musical section (stored in the memory circuit 6)

X: count value

X−1: count value of one before this time

WA: auxiliary flag A for discriminating a triplet. If the count value becomes 16–23, there is possibility of ♩/3. If the count value of 16–23 is detected at the beginning of an interval at unit of a quarter note, WA=1; if it is detected at twice consecutively, WA=2; in other states, WA=0. Thereby the flag is used to help the discrimination of a triplet ( ♪♪♪ with 3 ).

WB: auxiliary flag B for discriminating a triplet. If the count value becomes 32–39, there is possibility of /3. If the count value of 32–39 is detected at the beginning of an interval at unit of a quarter note, WB=1; if it is detected at twice consecutively, WB=2; in other states, WB=0. Thereby the flag is used to help the discrimination of a triplet ( ♩♩♩ with 3 ).

Figure 10:
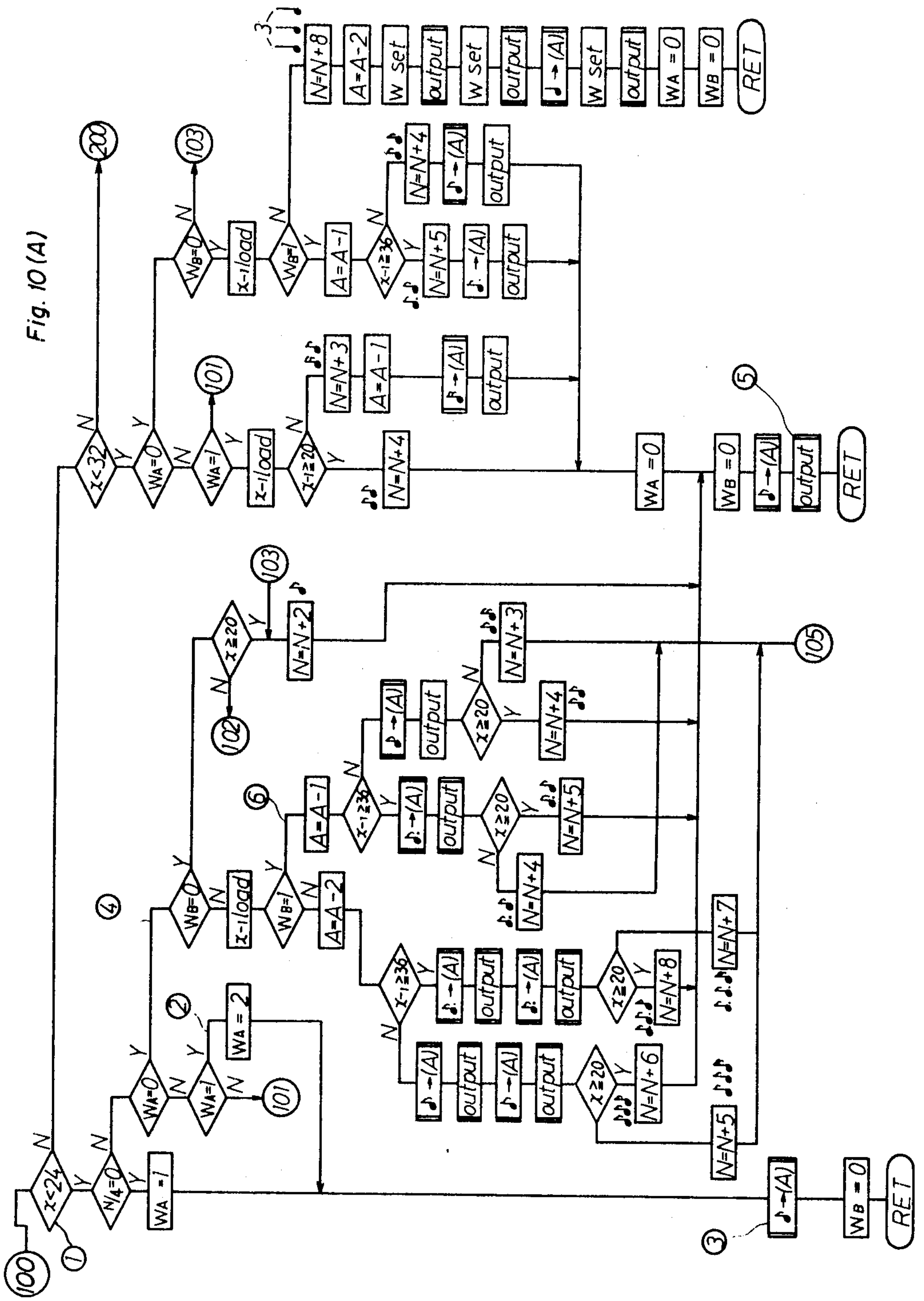
FIGS. 10(A),(B) is a flow chart illustrating a specific processing flow of the processing routine ASIN in FIG. 9.
Figure 10:
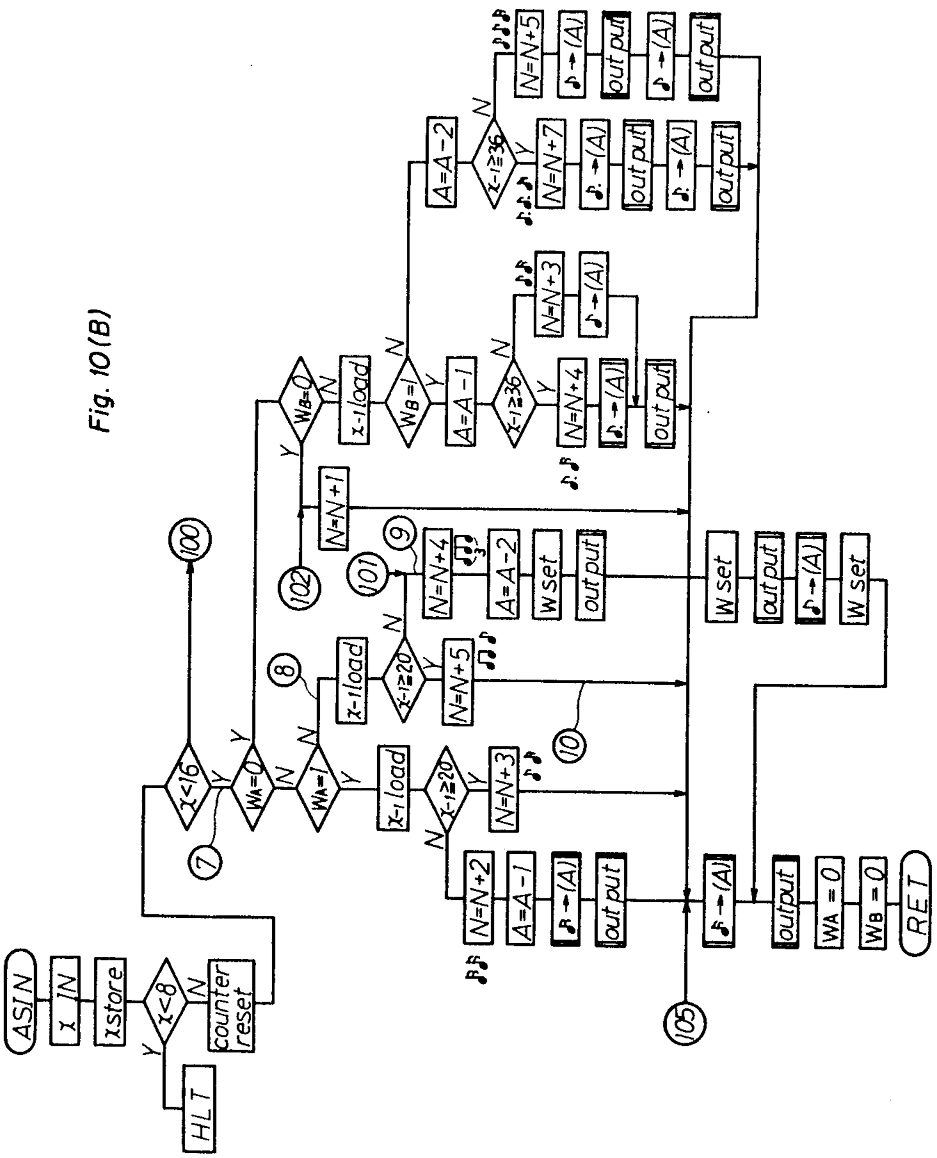

For example, if the count value of X=18 is detected, as shown in FIG. 10(A), X<24 is decided at step 1 and whether the detected value is at the beginning of interval of a quarter note is checked. If the decision is Yes, there is possibility of a triplet. Then, WA is set to 1, and code of ♪ is registered in the memory circuit 6. If the detected value is not at the beginning of interval and WA=1, notes having possibility of a triplet appear at twice consecutively. Then, WA is set to 2, and code of ♪ is registered (route of 2 ). In any of above mentioned cases, the interval cannot be determined until the last note is confirmed therefore setting of N is not performed.

Processing "♪→(A)" in step 3 means that code of ♪ is registered in the memory circuit 6 shown by address A. In this case, only the note-length data $b_0$, $b_1$, $b_2$ and W among the note data are processed, and the musical interval data $b_3$–$b_7$ are held in the previous state.

Step of "output" 5 shows processing that the code data $b_0$–$b_7$ and W synthesized in above mentioned manner are transmitted outwards through the memory circuit 6. At the same time, address A is incremented by +1.

If the detected value is not at the beginning of interval ($N/4 \neq 0$) and $WA=0$, it is decided that there is little possibility of data in $X=18$ constituting one note of a triplet, and processing of non-triplet (route of 4 ) is performed. In this case, N is always set to any of values, and if necessary the note-length data in address $A-1$, $A-2$ is changed and outputted in sequence. Musical note signs set forth to lateral sides of routines in the flow chart shows that combination of notes is decided to be pattern shown in musical note sign by corresponding processing routine. This decision is based on values in X and $X-1$.

Considering above mentioned case ($X=18$) for example, if $WB=0$, this note is decided to be error of either 𝅘𝅥𝅯 or ♪. When $X \geqq 20$, step 5 is executed through $N=N+2$; when $X<20$, routine of ♪ ( 102 ) is executed. If $WB \neq 1$, the previous note-length data also has little possibility of constituting one note of a triplet. Because, when WB is set to one or two, the count value X ranges 32–39 as shown in Table 1 and is distinguished from value $X<24$. In this case, therefore, the note-length data registered in address $A-1$ or $A-2$ in the memory circuit 13 must be changed. Criterion of changed data is value of X in the previous processing of one before this time, that is $X-1$. In the case of this example ($X=18$), if $WB=1$, the processing executed in routine of 6 , and after decrementing A by 1 the value of $X-1$ is checked. When $X-1 \geqq 36$, the preceeding note by one is decided to be ♪ ; when $X-1<36$, the preceeding note by one is ♪ . Moreover, data of X at this time are classified in similar manner to the above by $X \geqq 20$ and $X<20$, thereby registered in any four patterns ♩. ♪ , ♩. 𝅘𝅥𝅯 , ♩ 𝅘𝅥𝅯 , ♪ 𝅘𝅥𝅯 and registered.

If the processing is executed in route 1 → 2 → 3 in this example, WA is set to 2. That is, a triplet ♫♪ (3) is completed, if further one value $16 \leqq X<24$ is entered. If value of $16 \leqq X<24$ is really entered, ♫♪ (3) is registered through route 101 and outputted. If $X<16$, since $X-1$ and X are in close value, it is decided that the previous two values are correct and new input data X is error of a triplet.

However, if $X-1$ is greater than 20, pattern ♪♪♪ is deemed to be more reasonable. Above mentioned processing route is shown in route 7 → 8 → 9 or 7 → 8 → 10 of FIG. 10(B).

Although FIG. 10(A) illustrates the decision processing only that to an eighth note or less, note-length codes of ♪., ♩ , ♩. , 𝅗𝅥 , 𝅗𝅥. , 𝅝 , may be discriminated in similar criterion and processing from route 200 and so on.

Figure 11:
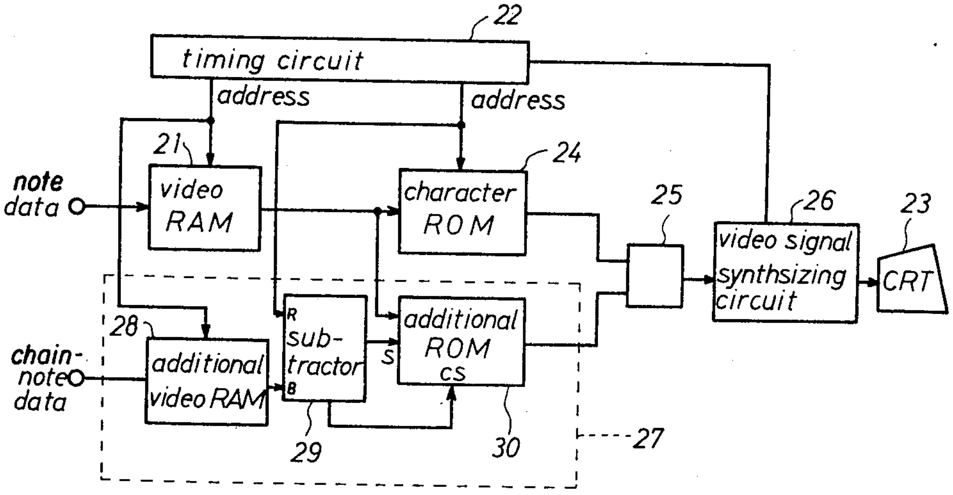
FIG. 11 is a block diagram illustrating an example of a musical note displaying device according to this invention.
Figure 12:
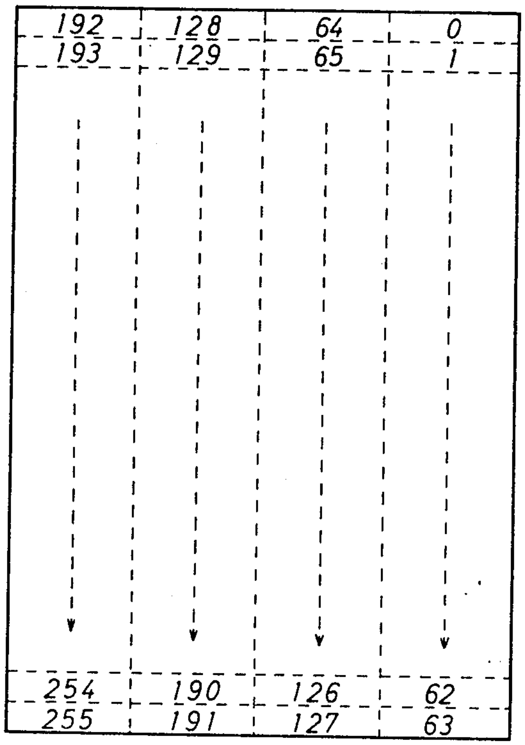
FIG. 12 is a diagram illustrating relation of position between address of a video RAM and a display pattern in this invention device.
Figure 13:
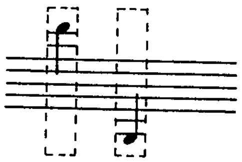
FIG. 13 is a diagram illustrating relation of position of the highest sound character and the lowest sound character on a staff.
Figures 14, 15:
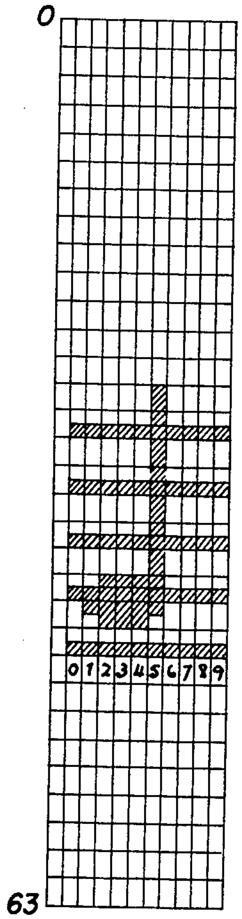
FIG. 14 is a format illustrating a constitution example of musical note codes.
FIG. 15 is a diagram illustrating a constitution example of a musical note character.

FIG. 11 shows an example of a musical note displaying device according to this invention. In the figure, numeral 21 designates a video RAM to write and read out data from the coding device or the like by address scanning signal from a timing circuit 22, and display position of one character on a displaying surface of a CRT display 23 corresponds to one address of the video RAM 21. The displaying surface of this embodiment is composed of horizontal 64 characters by vertical 4 lines, and FIG. 12 shows relation of position between address of the video RAM 21 and the displaying surface. Musical note data stored in address of the video RAM 21 are note codes corresponding to the number of all characters of musical interval data (from the highest tone to the lowest tone) and note-length data (from a sixteenth note to a whole note). If the musical interval extends between the upper third space and the lower third space shown in FIG. 13, the musical interval codes become 19 sorts (not including ♯, ♭) and the note-length becomes eight sorts 𝅘𝅥𝅯 , 𝅘𝅥𝅯. , ♪ , ♪. , ♩ , ♩. , 𝅗𝅥 , 𝅗𝅥. , 𝅝 . Accordingly, if the musical interval codes are five bits and the note-length codes are three bits, these codes may be constituted by codes of eight bits as shown in FIG. 14.

Since five bits are provided for the musical level codes, codes of 32 sorts can be used at the maximum therefore a margin is left for 19 sorts. If specific interval code for example "0000" is defined as a rest code, various rests can be represented by combination with note-length codes $A_0$, $A_1$, $A_2$. Furhtermore, residual member of the interval data can be utilized for representing ♯, ♭, ♮, 𝄞 , section line or the like.

The musical note data requires chained note pattern selecting code of four bits as data of the video RAM. Therefore the video RAM data are constituted in 12 bits including the chained note pattern selecting code of four bits as shown in FIG. 14.

In FIG. 11, numeral 24 designates a character ROM. In the character ROM 24, note codes of data transmitted from the video RAM 21 are made address signals and note patterns based on the address signals are outputted as display data. FIG. 15 shows an example of a character in such a processing. As clearly seen from FIG. 15, one character is composed of dots arranged in lateral 10 by vertical 64. The number ranging 0–63 in vertical direction is called ROW address, and scanning is effected in sequence from the top in timed relation with the video scanning line. Note codes outputted from the video RAM 21 correspond to upper address of the character ROM 24, and ROW address scanning signals outputted from the timing circuit 24 correspond to lower address.

Display data from the character ROM 24 are entered through a gate circuit 25 (group of OR gates) in a video signal synthesizing circuit 26. The video signal synthesizing circuit 26 synthesizes the display data from the character ROM 24 and horizontal and vertical synchronizing signals from the timing circuit 22, and transmitts the synthesized signals as serial data into a CRT display 23 so as to perform the musical note displaying.

Figure 1:
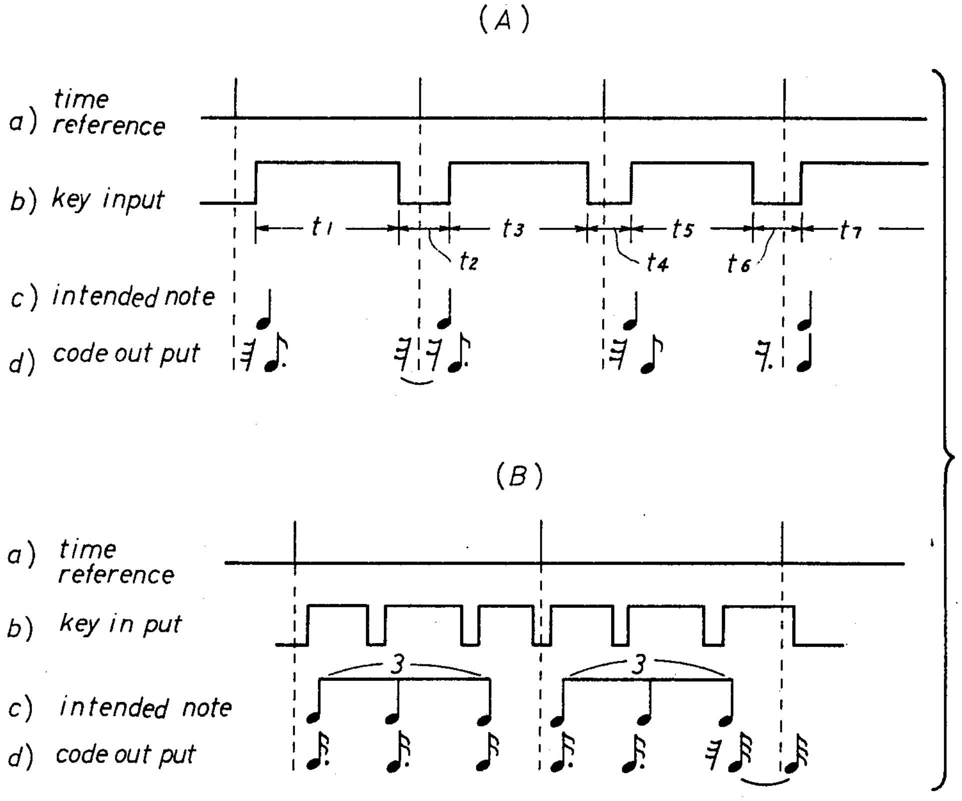
FIGS. 1(A),(B) is a diagram illustrating coding of musical notes using a conventional device.
Figure 2:
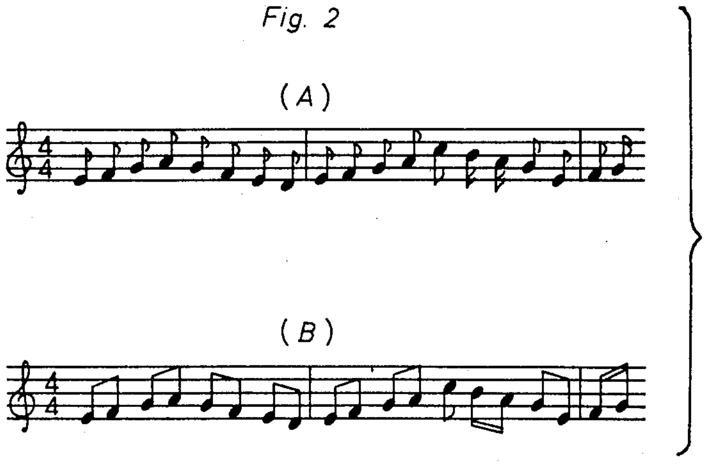
FIGS. 2(A),(B) is a diagram showing an example representing musical notes.

An additional note-chaining circuit 27 for displaying a chained note comprises an additional video RAM 28, a subtractor 29 and an additional ROM 30. The additional video RAM 28 is composed of 256 words by 6 bits in similar manner to the video RAM 21, and address scanning signals are applied thereto from the timing circuit 22 and address assignment based on this corresponds to the same position of displaying surface as the video RAM 21. Chained-note data to be entered are written in address for chained-note display; maximum value of ROW address (value of 63 in this embodiment) is written in address without chained-note displaying. As shown in FIG. 2(B), vertical position of a chain to connect two sequential notes depends on height of the notes, i.e. the musical interval. Accordingly, data regarding the connecting position are written to the additional RAM as vertical address data corresponding to the ROW address.

The subtractor 29 receives the vertical address data from the additional RAM, i.e. height data B and the ROW address signal R from the timing circuit 22. Data of $R-B=S$ are entered in the additional ROM 30 as starting address for ROW address to generate the chained-note pattern.

The additional ROM 30 receives also the chained-note pattern selecting code from the video RAM 21, and transmitts chained-note pattern corresponding to position on five lines of a staff based on the chained-note pattern generating ROW address data and the chained-note pattern selecting data through the gate circuit 25 into the video signal synthesizing circuit 26.

In order to produce a chained-note pattern, all following conditions must be satisfied.

(a) Sixteenth or eighth notes appear at twice consecutively.
(b) In the case of sequential sixteenth notes, the previous note is at an interval of the order of odd number in unit of a sixteenth note.
(c) In the case of sequential eighth notes, the previous note is at a first interval in unit of a quarter note in similar manner to condition (b).
(d) Musical interval between two sounds is within three degrees.
(e) Height of two sounds is disposed on the same side with respect to the third line (same hook direction).
(f) The subsequent sound is not accompanied by ♯, ♭, ♮.

According to the above mentioned conditions, the chained-note patterns to be stored in the additional ROM 30 requires 12 sorts as set forth in Table 3. In Table 3, "previous" indicates that the note corresponding to the chained-note pattern is the previous note (see FIG. 17(A), address $A_1$ side), and "subsequent" indicates that it is the subsequent note (see FIG. 17(A), address $A_2$ side).

Figure 16:
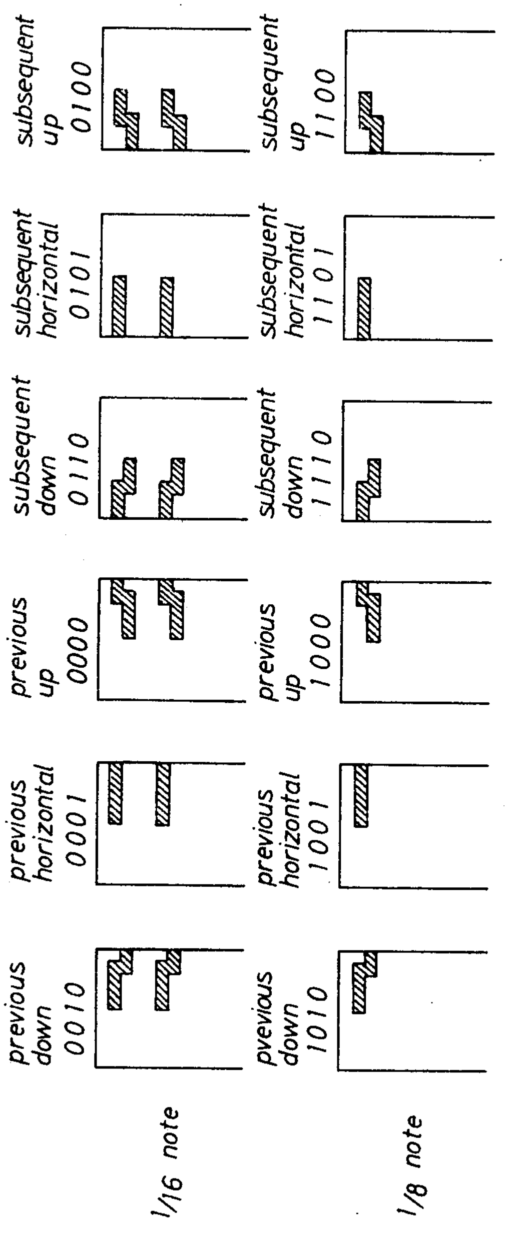
FIG. 16 is a schematic diagram illustrating various examples of musical note characters.

Individual chained-note pattern selecting codes are set as shown in Table 3. The chained-note pattern selecting codes are defined as upper address in the ROW address data, stored in the additional ROM 30, and supplied from upper four bits of outputs of the video RAM 21. Individual chained-note patterns in Table 3 are illustrated in FIG. 16.

TABLE 3

| note | previous/ subsequent | direction | selecting code |
|---|---|---|---|
| 1/16 | previous | up | 0 0 0 0 |
| " | " | horizontal | 0 0 0 1 |
| " | " | down | 0 0 1 0 |
| " | subsequent | up | 0 1 0 0 |
| " | " | horizontal | 0 1 0 1 |
| " | " | down | 0 1 1 0 |
| $\frac{1}{8}$ | previous | up | 1 0 0 0 |
| " | " | horizontal | 1 0 0 1 |
| " | " | down | 1 0 1 0 |
| " | subsequent | up | 1 1 0 0 |
| " | " | horizontal | 1 1 0 1 |
| " | " | down | 1 1 1 0 |

Operation of the device will now be described.

If the satisfication of above mentioned conditions (a)–(f) for chained-note indication is discriminated in external discriminating circuit or the like, musical note data of a quarter note in place of an eighth note or a sixteenth note is written in address of the video RAM which requires chained-note indication. At the same time, any of chained-note selecting data set forth in Table 3 is written to upper four bits of the video RAM, chained-note pattern to be superposed with the quarter note pattern is selected. Also ROW address data to generate chained-note pattern is written to the additional video RAM.

Figure 17:
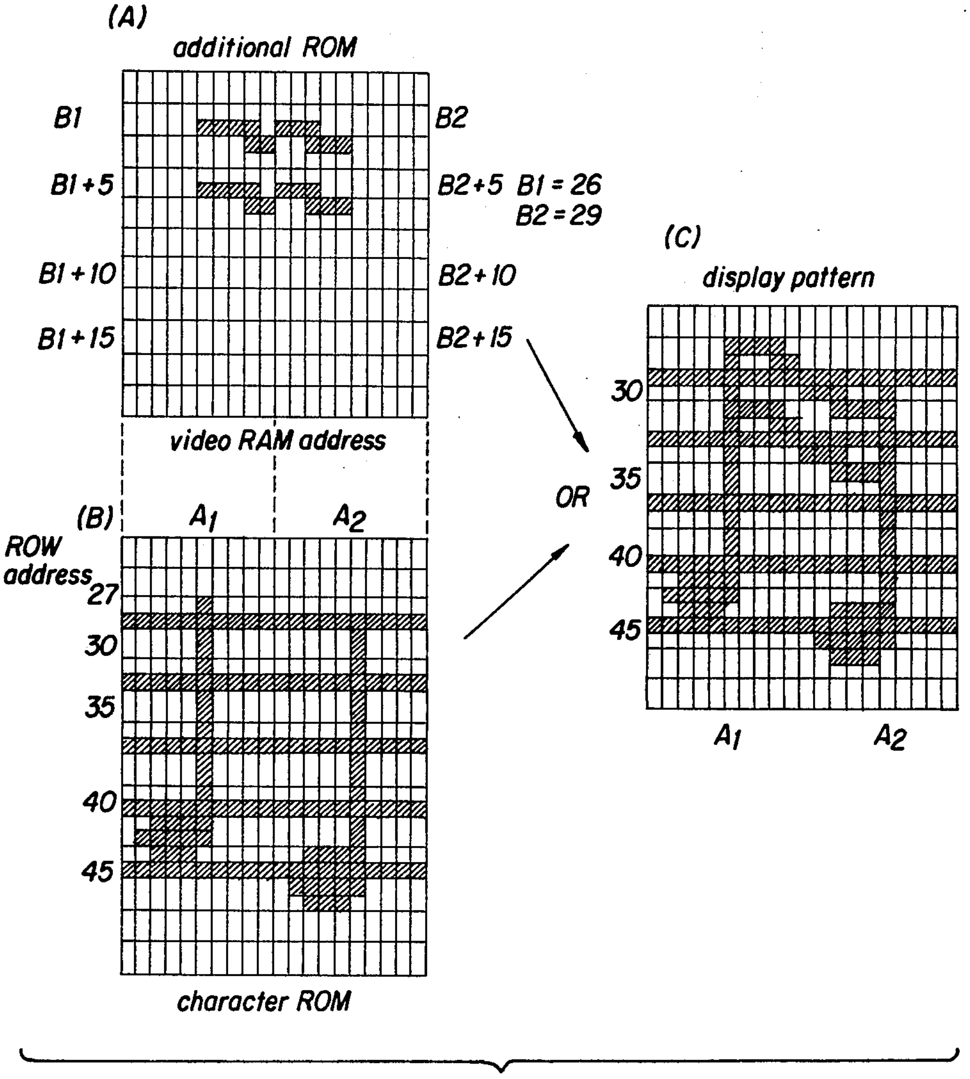
FIGS. 17(A),(B),(C) is a diagram illustrating displaying examples of chained-note patterns according to the invention device.

For example, assuming that the musical note pattern of address $A_1$, $A_2$ of the video RAM 21 is as high as shown in FIG. 17(B), front address ($B1$, $B_2$) of the additional ROM 30 to be superposed with the musical note pattern (B) is set so that $B_1=26$, $B_2=29$ as shown in FIG. 17(A). Thereby display pattern in FIG. 17(C) is obtained.

That is, chained-note data is written to the additional video RAM 28 so that output of the additional video RAM 28 in address $A_1$ becomes 26, and output of the additional video RAM in address $A_2$ becomes 29. Output of the additional video RAM is subtracted at the subtractor 29 from ROW address data. Thereby in address $A_1$, $$\text{ROW address} \geqq 26$$

Subtraction output is positive and increased in order $S=1, 2, 3, \ldots$ as the ROW address increases. Also in address $A_2$, $$\text{ROW address} \geqq 29$$

Subtraction output is positive and increased in order $S=1, 2, 3, \ldots$ as the ROW address increases. If the subtraction output S is made ROW address data of the additional ROM 30, relative position with respect to basic character ROM pattern of the additional ROM 30 can be controlled.

If the subtraction output is negative, the additional ROM 30 does not produce pattern, therefore output of the additional ROM is inhibited using the carry output $C_0$ of the subtractor 29. As above described, maximum ROW address=63 is not outputted from the additional video RAM in address which does not produce chained-note pattern, therefore subtraction output is always negative and the additional ROM does not produce output.

As above described, when ROW address data to generate chained-note pattern is written to the additional video RAM and RAM address signal generated from the timing circuit 22 becomes a prescribed value, the video RAM 21 produces musical note data of a quarter note and chained-note pattern selecting data, and the additional video RAM 28 produces ROW address data for generating chained-note pattern, therefore the character ROM 24 produces chained-note pattern corresponding to a quarter note as above described.

If sum of each bit of outputs of the character ROM 24 and corresponding bit of the additional ROM 30 is synthesized in the video signal synthesizing circuit 26, a quarter note and chained-note pattern are superposed thereby chained-note pattern as shown in FIG. 17(C) is obtained.

As above described, a keyboard input coding device of this invention is provided with a memory circuit, thereby credibility of note-length data is checked by referring to relation of sequential notes and the most reasonable series of notes are set, therefore key input by pushing keys can be coded into note input to agree well with intention of a user, and detection of a triplet can be effected at high credibility, thereby application to electronic musical instruments such as synthesizer is possible. A musical note displaying device utilizing musical note signals outputted from the keyboard input coding device can connect sequential eighth or sixteenth notes as a chained note under a given condition and display the chained-note pattern, thereby application in pattern displaying on a CRT display, that is, a musical composition device including a staff which can be clearly seen, is possible.

I claim:

1. An electronic musical instrument comprising a keyboard means for generating the keyboard signals by means of keying operation, a musical interval code producing means for producing the musical interval codes based on the keyboard signals from the said keyboard means, a detecting means for detecting rise and fall states of the said keyboard signals, a counting means for counting ON and OFF duration of the said keyboard signals and outputting counting data, a memory means of data for note-length coding for memorizing predetermined comparing data and triplet discriminating data, a note-length discriminating means for receiving said counting data based on signals from the said detecting means and coding the said counting data according to said comparing data in the said memory means and correcting the data according to the said triplet discriminating data taken in sequence and thus providing note-length data for discriminating the note-length of the notes having possibility of a triplet, and a controlling means for controlling the said memory means and note-length discriminating means.

2. An electronic musical instrument according to claim 1, wherein the said controlling means is provided with a note data memory circuit, which stores said discriminated note-length data as having possibility of a triplet and which outputs a chained-noted sign when chained-note data corresponding to one interval is stored.

3. An electronic musical instrument according to claim 2, wherein the said memory means of data for note-length coding, in which the said triplet discriminating data has a data X−1 immediately preceding an original data X of note-length to be discriminated and also a data corresponding to the number of notes at the beginning of an interval.

4. An electronic musical instrument according to claim 3, wherein the said controlling means has a control circuit which codes the note-length original data X to the note-length of a triplet by the said comparing data previously determined, and registers the coded data X in the said note data memory circuit without modification, if the said coded data X is at the beginning of one interval, and registers the coded data X as data having possibility of a triplet in the said note data memory circuit, if said coded data X is not at the beginning of one interval, only when the data X−1 is coded in similar note-length of a triplet.

5. An electronic musical instrument according to claim 1, wherein the musical interval code producing means comprises a plurality of encoders in parallel arrangement for producing signals of three bits from eight inputs connected to the said keyboard means, signal lines to indicate which of said plurality of encoders is selected in keying operating of the said keyboard, and a gate circuit of the said bits of each of said plurality of encoders as parallel inputs and producing interval output signals to indicate musical interval.

6. An electronic musical instrument according to claim 1 wherein the note-length discriminating means comprises a reference time generating circuit for supplying a data for partitioning a musical section and a speaker connected to said reference time generating circuit to generate a signal tone for metronome.

7. An electronic musical instrument according to claim 1, wherein the said controlling means is a control circuit which is controlled in program control by a central processing unit CPU.

8. A musical note displaying device comprising a timing circuit which produces the output of an address scanning signal, a video RAM for taking the input of the said address scanning signal and a musical note data, a character ROM for generating a musical note pattern based on the signal from the said video RAM, and said address scanning signal, an additional note-chaining circuit for taking note-chaining data of a musical interval between sequential two musical notes and note-chaining pattern corresponding to musical note position, and also comprising a synthesizing circuit for producing the output of a synthesized pattern according to the note-chaining pattern generated from the said additional note-chaining circuit and the musical note pattern generated from the said character ROM, and a CRT display for displaying a musical note in a pattern based on said synthesized pattern from said synthesizing circuit.

9. A musical note displaying device according to claim 8, wherein said additional note-chaining circuit comprises an additional video RAM to write chained-note data as vertical address data corresponding to a ROW address, a subtractor to subtract output of the additional video RAM from ROW address data of the timing circuit, and an additional ROM for chained-note pattern to receive the subtractor output as ROW address data.

10. A musical note displaying device according to claim 8 or 9, comprising a first discriminating circuit to discriminate that sixteenth or eighth notes appear twice consecutively, a second discriminating circuit to discriminate that the previous note is at an interval of the order of odd number in unit of a sixteenth note in the case of sequential sixteenth notes, a third discriminating circuit to discriminate that the previous note is at a first interval in unit of a quarter note in similar manner to condition of the said second discriminating circuit in the case of sequential eighth note, and a fourth discriminating circuit to discriminate that the subsequent note among the sequential notes are note accompanied by ♯, ♭, and ♮, and also comprising a selecting circuit wherein the address of the video RAM is changed and chained-note pattern is selected based on output of the first discriminating circuit through the fourth discriminating circuit, and also comprising a control circuit for controlling the same first discriminating circuit through fourth discriminating circuit and the said selecting circuit as well wherein said device further comprises a means for determining whether the interval between sounds is three degrees or less and means for determining whether the height of two sounds is disposed on the same side with respect to a third line of a staff.

* * * * *